United States Patent [19]

Magara

[11] Patent Number: 5,149,931
[45] Date of Patent: Sep. 22, 1992

[54] POWER SOURCE FOR ELECTRIC DISCHARGE MACHINING

[75] Inventor: Takuji Magara, Aichi, Japan

[73] Assignee: Mitsubishi Denki K.K., Tokyo, Japan

[21] Appl. No.: 501,895

[22] Filed: Mar. 30, 1990

[30] Foreign Application Priority Data

| Apr. 11, 1989 | [JP] | Japan | 1-91433 |
| Apr. 11, 1989 | [JP] | Japan | 1-91434 |
| Apr. 11, 1989 | [JP] | Japan | 1-91435 |
| Sep. 21, 1989 | [JP] | Japan | 1-245498 |

[51] Int. Cl.$^5$ .............................................. B23H 1/02
[52] U.S. Cl. ............................. 219/69.13; 219/69.18; 333/17.3
[58] Field of Search .................... 219/69.13, 69.18; 333/20, 32, 12, 17.3

[56] References Cited

U.S. PATENT DOCUMENTS

| 2,230,803 | 2/1941 | Klipsch et al. | 333/20 |
| 2,689,311 | 9/1954 | Melville | 333/20 |
| 3,466,416 | 9/1969 | Maillet | 219/69.13 |
| 3,609,281 | 9/1971 | Kauffman | 219/69.13 |
| 3,660,787 | 5/1972 | Mahmoud et al. | 333/12 |
| 3,777,108 | 12/1973 | Maillet | 219/69.13 |
| 3,893,013 | 7/1975 | Mironoff | 219/69.13 |
| 4,095,198 | 6/1978 | Kirby | 333/32 |
| 4,112,395 | 9/1978 | Seward | 333/32 |
| 4,275,312 | 6/1981 | Laudenslager et al. | 333/20 |
| 4,356,458 | 10/1982 | Armitage | 333/17.3 |
| 4,373,581 | 2/1983 | Toellner | 333/17.3 |
| 4,375,051 | 2/1983 | Theall | 333/17.3 |
| 4,617,443 | 10/1986 | Martin | 219/69.13 |
| 4,833,431 | 5/1989 | Bieniosek | 333/20 |
| 4,882,541 | 11/1989 | Haragashira | 333/17.3 |
| 4,945,199 | 7/1990 | Tanaka et al. | 219/69.13 |

FOREIGN PATENT DOCUMENTS

| 2507053 | 8/1975 | Fed. Rep. of Germany . |
| 3326582 | 2/1984 | Fed. Rep. of Germany . |
| 2908696 | 12/1987 | Fed. Rep. of Germany . |
| 57-68913 | 4/1982 | Japan | 333/12 |
| 61-260914 | 11/1986 | Japan . |
| 61-260915 | 11/1986 | Japan . |
| 61-260923 | 11/1986 | Japan . |

OTHER PUBLICATIONS

Patent Abstracts of Japan, vol. 11, No. 120, Apr. 15, 1987 (M-580) (JP 61-260915).
Patent Abstracts of Japan, vol. 11, No. 120, Apr. 15, 1987 (M-580) (JP 61-260923).
Abstract (A3563/02) of SU-657,945.

Primary Examiner—Geoffrey S. Evans
Attorney, Agent, or Firm—Sughrue, Mion, Zinn, Macpeak & Seas

[57] ABSTRACT

A power source for electric discharge machining, which performs a semi-mirror-finish machining operation with a surface roughness of 1 μm Rmax or less. The power source includes either a resonance circuit or an impedance matching circuit so that the electric discharge is carried out under the condition that resonance is caused to occur with the capacitance of an interelectrode gap between an electrode and a workpiece to be machined or the impedance-matching is effected in response to variation in interelectrode condition. With such a power source, it is possible to eliminate the effect of the stray capacitance exsiting in a current supplying line and also to eliminate the shortcoming due to variation on the interelectrode condition, and therefore a mirror-finished machining operation can be stably carried out to provide machined surfaces excellent in surface roughness.

17 Claims, 8 Drawing Sheets

WIRE DIAMETER φ0.2
THICKNESS OF WORKPIECE 20mm

POWER SOURCE FOR ELECTRIC DISCHARGE MACHINING

BACKGROUND OF THE INVENTION

This invention relates to a power source for an electric discharge machining, and more particularly to an electric discharge machining power source for performing a semi-mirror-finish machining operation with a surface roughness of 1 μm Rmax or less.

In a high frequency electric discharge machining method, the average machining voltage is zero (0), and therefore there is no occurrence of chipping due to electrolytic action. Furthermore, the polarity is altered every half cycle of electric discharge thereby resulting in the change of the discharge point every electric discharge. Hence, the surface machined by the method is excellent in quality; that is, the high frequency electric discharge machining method is excellent in machining performance.

FIG. 1 is a circuit diagram showing a conventional power source for an electric discharge machining apparatus disclosed in Published Unexamined Japanese Patent Application (OPI) No. 260915/1986. In FIG. 1, reference numeral 1 designates a DC source; 2, a current limiting resistor; 6, a gap between an electrode and a workpiece facing each other; 3, a stray capacitance existing in a current supplying line and the gap 6; and 4, a stray inductance existing in the current supply line and the gap 6; 7, a switching element; 8, a drive circuit for driving the switching element 7; and 9 and 10, a coupling capacitor and a coupling coil, respectively, the coupling capacitor 9 and the coupling coil 10 forming a series circuit which is connected between the switching element 7 and the gap 6.

FIGS. 2 and 3 are equivalent circuits of the electric discharge machining power source shown in FIG. 1 for a description of the operation of the circuit.

Now, the operation of the electric discharge machining power source thus constructed will be described. In the case where the inductance of the coupling coil 10 is sufficiently larger than the stray inductance 4, when the switching element 7 is turned off, the circuit is regarded as a series circuit consisting of $R_1$, $C_1$, $L_1$, $C_2$ and the DC source as shown in FIG. 2, as a result of which $C_1$ and $C_2$ are charged by a current as indicated by an arrow in FIG. 2. When, under this condition, the switching element 7 is turned on, the circuit is changed into a series circuit consisting of $C_2$, $L_1$ and $C_1$ as shown in FIG. 3, so that $C_1$ and $C_2$ are discharged as indicated by an arrow in FIG. 3. The switching element 7 is turned on and off by the drive circuit 8 at several megahertz (MHz), so that a high frequency voltage is developed across the gap 6, to perform an electric discharge machining operation.

In general, $$E_p = (E_o - E_a)\sqrt{C/L}$$

$$T_p = \pi\sqrt{LC}$$

where L is the stray inductance, C is a stray capacitance, $E_p$ is a current peak, $T_p$ is a current pulse width, $E_o$ is a gap voltage, and $E_a$ is an arc voltage. Therefore, it is well known in the art that the discharge energy is decreased as L and C decrease.

The stray capacitance 3 is the sum of the above-described capacitance existing in the current supplying line and the capacitance of the gap 6 (between the electrode and the workpiece). A machined surface excellent in quality, 1 μm Rmax or less in surface roughness, can be obtained by setting the stray capacitance 3 to 1000 pF or less.

The conventional electric discharge machining power source is constructed as described above. Therefore, it is indispensable to decrease the stray capacitance 3 in order to obtain a machined surface excellent in quality. However, in practice it is considerably difficult to reduce the stray capacitance to less than 500 pF. And accordingly, it is impossible to obtain a machined surface which is 0.5 μm Rmax or less in surface roughness.

When, in an electric discharge machining operation, the machining gap and the machining area are changed, or when the conditions of electric discharge are changed, then the impedance of the interelectrode gap 6 is greatly changed. This results in great change in the output. Consequently, the conventional device is disadvantageous in that the electric discharge machining operation is considerably unstable, and is low in reproducibility.

SUMMARY OF THE INVENTION

Accordingly, an object of this invention is to eliminate the above-described difficulties accompanying a conventional electric discharge machining power source. More specifically, an object of the invention is to provide an electric discharge machining power source in which the effect of the stray capacitance of the current supplying line is eliminated, and the influence of variation of the interelectrode impedance is also eliminated, so that a mirror-finish machining operation can be stably carried out to provide machined surfaces excellent in surface roughness.

The above and other objects of the present invention are met by the provision of a power source constructed according to the present invention as follows. A first example of an electric discharge machining power source according to the invention comprises: an AC power source for applying an AC voltage to an interelectrode gap formed between an electrode and a workpiece to be machined; and an L-shaped circuit including a capacitor connected in parallel with the interelectrode gap, and a coil connected in series with the interelectrode gap, the L-shaped circuit being arranged near to the interelectrode.

A second example of the electric discharge machining power source according to the invention comprises: an AC power source for applying an AC voltage to an interelectrode gap formed between an electrode and a workpiece to be machined; and means for causing resonance to occur with a capacitance of the interelectrode gap and the inductance component of a circuit between the interelectrode gap and the AC source.

A third example of the electric discharge machining power source according to the invention comprises: an AC source for applying an AC voltage to an interelectrode gap formed between an electrode and a workpiece to machined; and a coupling transformer provided near the interelectrode gap, resonance being caused to occur with a capacitance appearing across the interelectrode gap between the electrode and the workpiece and the inductance of a coil of the coupling transformer to machine the workpiece.

A fourth example of the electric discharge machining power source according to the invention comprises: an AC source for applying an AC voltage to the interelectrode gap formed between an electrode and a workpiece to be machined; an output detecting unit for detecting an output of the AC source; and a frequency control circuit for automatically changing the frequency of the AC power source according to the detection value of the output detecting unit.

A fifth example of the electric discharge machining power source according to the invention comprises: an AC source for applying an AC voltage to an interelectrode gap between an electrode and a workpiece to be machined; and an automatic impedance matching unit provided between the AC source and the interelectrode gap.

In the first example of the electric discharge machining power source according to the invention, resonance is caused to occur with the capacitance of the interelectrode gap formed between the electrode and the workpiece and the inductance of the L-shaped circuit provided near the interelectrode gap, to machine the workpiece.

In the second example of the electric discharge machining power source according to the invention, resonance is caused to occur with the capacitance of the interelectrode gap formed between the electrode and the workpiece, and the inductance of the coupling circuit between the AC source and the interelectrode gap. Under this resonance condition, electric discharge is inducted in the interelectrode gap to machine the workpiece.

In the third example of the electric discharge machining power source according to the invention, resonance is caused to occur with the capacitance of the interelectrode gap formed between the electrode and the workpiece and an inductance of a secondary (interelectrode-side) coil of a coupling transformer which is provided in the vicinity of the interelectrode gap. Under this condition, an electric discharge is inducted to machine the workpiece.

In the fourth example of the electric discharge machining power source according to the invention, even when the impedance of the interelectrode gap formed between the electrode and the workpiece is changed with variation of the machining gap or area during machining, the frequency of the AC power source is automatically changed by the frequency control circuit, whereby the workpiece is machined while impedance matching is being adjusted.

In the fifth example of the electric discharge machining power source according to the invention, even when the impedance of the interelectrode gap formed between the electrode and the workpiece is changed with variation of the machining gap or area during machining, the automatic impedance matching unit provided between the AC power source and the interelectrode gap is operated, whereby the workpiece is machined while impedance matching is being automatically adjusted.

BRIEF DESCRIPTION OF THE DRAWINGS

In the accompanying drawings.

DESCRIPTION OF THE PREFERRED EMBODIMENTS

Preferred embodiments of this invention will be described with reference to the accompanying drawings.

Figure 4:
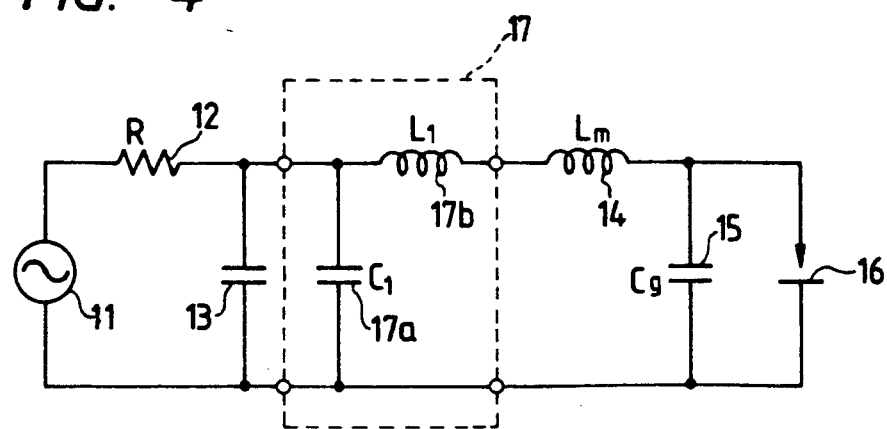
FIG. 4 is a circuit diagram showing an electric discharge machining power source, which is a first embodiment of this invention.

FIG. 4 is a circuit diagram showing an electric discharge machining power source, which is a first embodiment of the invention. In FIG. 4, reference numeral 11 designates an AC power source; 12, a current limiting resistor; 13, a stray capacitance existing in a current supply line (feeder line) and the circuit; 14, a stray inductance (distributed inductance $L_m$) existing in the current supply line and a mechanical structure (such as a current supplying section); 15, an interelectrode capacitor (gap capacitor $C_g$) formed between an electrode and a workpiece to be machined; 16, a gap formed between the electrode and the workpiece; 17a, a capacitor parallel-connected near the gap 16; and 17b, a coil series-connected near the gap 16. The capacitor 17a and the coil 17b form an L-shaped circuit 17.

Figure 5:
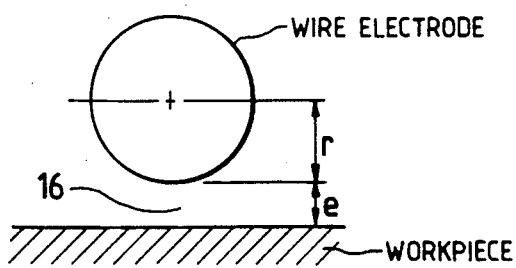
FIG. 5 is an explanatory diagram showing an interelectrode gap formed between an electrode and a workpiece in the power source shown in FIG. 4.
Figure 6:
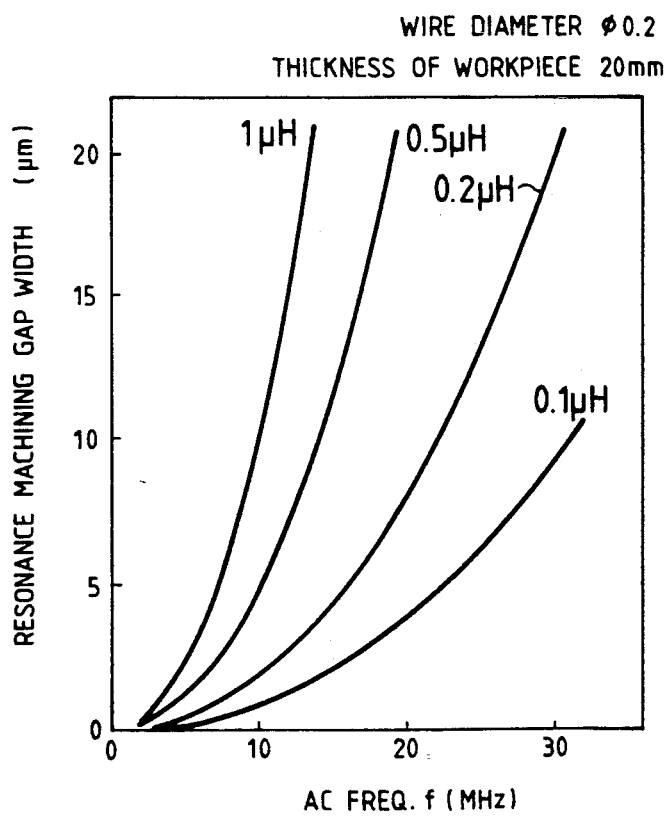
FIG. 6 is a graphical representation indicating, with several power source frequencies, relation between inductances of an L-shaped circuit and resonance machining gaps.

FIG. 5 is an explanatory diagram showing the gap formed between the electrode and the workpiece in the electric discharge machining power source shown in FIG. 4. FIG. 6 is a graphical representation indicating the relationships between inductance of the L-shaped circuit and resonance machining gaps with several power frequencies.

Now, the operation of the electric discharge machining power source shown in FIG. 4, the first embodiment of the invention, will be described. As shown in FIG. 5, the stray inductance 14 (distributed inductance $L_m$) existing in the mechanical structure, and the interelectrode capacitance 15 (gap capacitance $C_g$) between the electrode and the workpiece depend much on the gap 16; i.e., the machining gap distance e. Where the coil 17b is connected to the gap 16 with the shortest wire, then the distributed capacitance 13 of the secondary feeder line can be disregarded, being several pico-Farad (pF). If, for simplification in description, the inductance of a coil of the L-shaped circuit 17 is represented by L, a resonance circuit is formed. The resonance frequency $f_o$ of the resonance circuit is expressed as follows:

$$f_o = 1/2\pi \sqrt{(L + L_m) \cdot C_g} \ (Hz)$$

Therefore, when the inductance of the L-shaped circuit 17 is increased with the gap capacitance $C_g$ maintained unchanged, the resonance frequency is decreased. When, in this case, the resonance frequency $f_o$ is maintained unchanged, the gap capacitance 15 ($C_g$) is decreased. Thus, resonance takes place with a wider machining gap.

As was described above, FIG. 6 shows the relationships between the inductance L of the L-shaped circuit 17 and resonance machining gaps with several power source frequencies. As is apparent from FIG. 6, as the inductance L increased, the machining gap is increased with which resonance takes place. This means that it is possible to obtain gap resonance with ease, and the resonance can be maintained stable even if the machining gap is changed (the gap capacitance 15 ($C_g$) is less variable with variation of the machining gap). Hence, the machining stability and the machining capability (discharge frequency) are improved remarkably.

Furthermore, the effect (distributed capacitance) of the primary feeder line is eliminated. This will be advantageous in practical use. However, if the inductance L is increased extremely, then the machining gap allowing resonance is also increased too much, as a result of which no dielectric breakdown is caused, and accordingly it becomes difficult to perform the machining with gap resonance. Hence, it is necessary to select the inductance L of the L-shaped circuit 17 according to the power source frequency. For instance in the case of an AC frequency of 10 MHz, by setting the inductance L to 0.5 to 1.0 $\mu$H the resonance machining gap can be set to 5 to 10 $\mu$m (in case of the thickness of a workpiece being 20 mm), whereby the machining operation can be performed stably.

In high frequency machining, displacement current may flow through the interelectrode capacitor 15 formed between the electrode and the workpiece (at the gap 16), and therefore the current in the gap 16 is represented by the sum of the discharge current and the aforementioned displacement current. According to actual measurements, when no electric discharge occurs, the displacement current leads the voltage; and at the occurrence of electric discharge, the current is substantially in phase with the voltage, and the circuit can be placed in resonance state. The displacement current, being the variation with time of the electric field in the machining gap (electrons not moving in the machining gap), will not contribute directly to the machining operation. The displacement current value and the phase difference depend on the capacitance of the gap 16 and the voltage frequency.

The above-described electric discharge machining operation with gap resonance is completely different in characteristic from the high frequency electric discharge machining operation disclosed in the aforementioned Japanese Patent Application (OPI) No. 260915/1986. In the electric discharge machining operation with gap resonance, the voltage appearing across the gap capacitor 15 ($C_g$) is increased high enough to cause dielectric breakdown; however, after occurrence of electric discharge, the inductance L will prevent the abrupt flow of current in the gap 16, so that the electric discharge machining operation is carried out with extremely small current capacity.

In the above-described embodiment, the L-shaped circuit 17 is provided near the gap 16, and therefore the machining operation can be carried out with the gap resonance caused at a frequency lower than 10 MHz. In this case, the resultant machined surface is excellent in surface roughness, being 0.2 $\mu$m Rmax. The machined surface is a lustrous semi-mirror-finish surface; whereas the surface formed by the ordinary high frequency electric discharge machining method is a satin finish surface.

In the above-described embodiment, the machining operation can be performed more stably by changing the frequency of the AC source 11 according to a given machining area or thickness.

Furthermore in the above-described embodiment, variation of the reactance of the L-shaped circuit 17 allows a stable electric discharge machining operation against variation of the gap capacitance 15.

Figure 7:
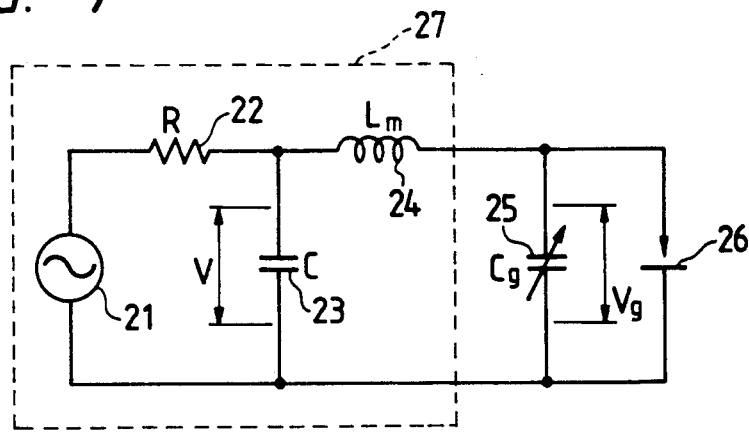
FIG. 7 is a circuit diagram showing an electric discharge machining power source, which is a second embodiment of the invention.

FIG. 7 is a circuit diagram showing an electric discharge machining power source, a second embodiment of the invention. In the figure, reference numeral 21 designates an AC source; 22, a current controlling resistor; 23, a stray capacitance existing in the current supplying line (feeder line); 24, a stray inductance existing in the current supplying line and a mechanical structure (such as a current supplying section); 25, an interelectrode capacitor (gap capacitor $C_g$) formed by an electrode and a workpiece to be machined; 26, a gap formed between the electrode and the workpiece; 27, a circuit provided between the interelectrode capacitor 25 and the AC source 21, the circuit being so designed that the reactance is inductive.

Figure 8:
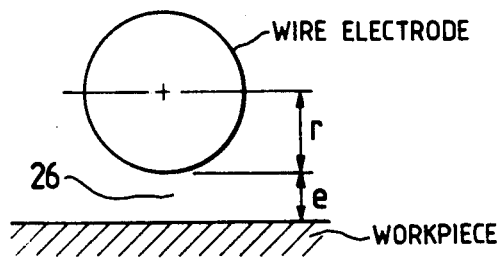
FIG. 8 is an explanatory diagram showing an interelectrode gap formed between an electrode and a workpiece in the power source shown in FIG. 7.
Figure 9:
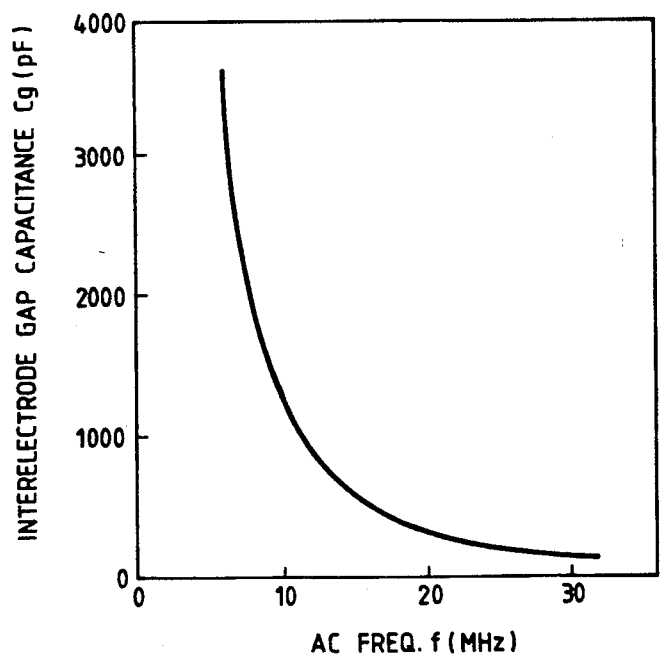
FIG. 9 is a graphical representation indicating the relationships between AC frequencies and resonance occurrence interelectrode capacitances in the electric discharge machining power source shown in FIG. 7.
Figure 10:
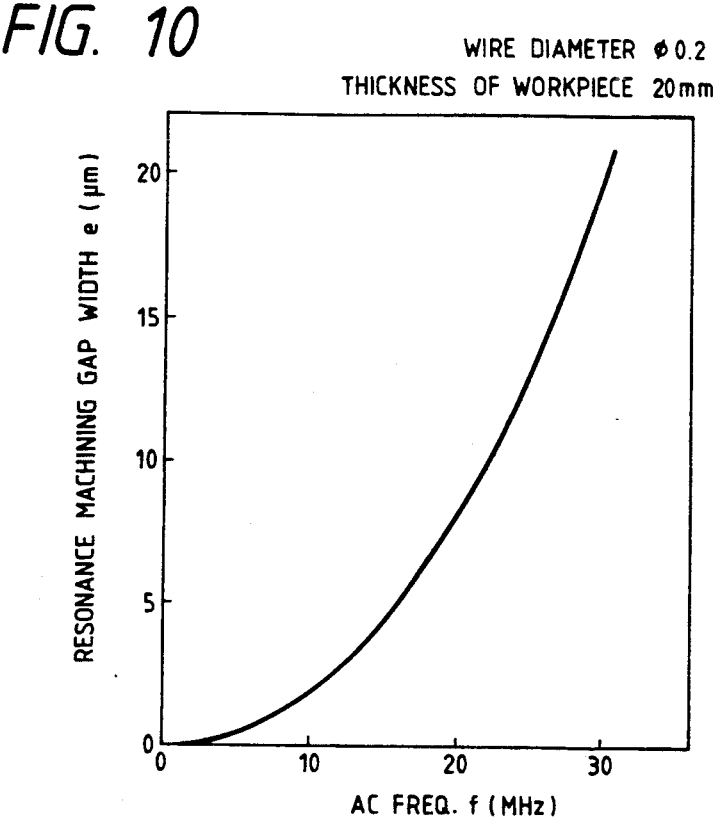
FIG. 10 is a graphical representation indicating AC frequencies with resonance machining gaps in the electric discharge machining power source shown in FIG. 7.
Figure 11:
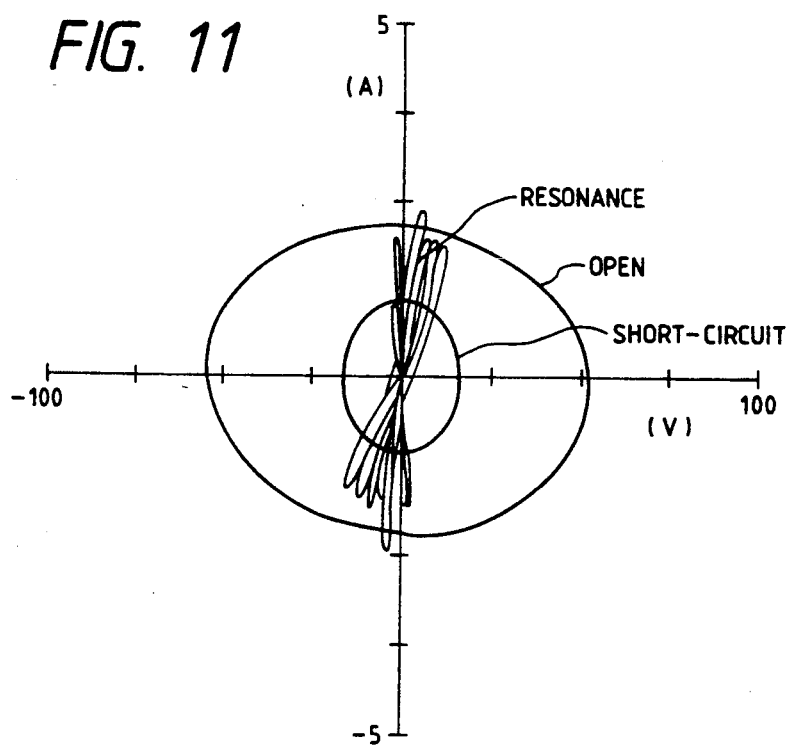
FIG. 11 is a diagram showing a voltage-current Lissajous's waveform at the gap resonance in the power source shown in FIG. 7.

FIG. 8 is an explanatory diagram showing the gap formed between the electrode and the workpiece in the electric discharge machining power source. FIG. 9 is a graphical representation indicating the relationships between AC frequencies and resonance occurrence interelectrode gap capacitances in the electric discharge machining power source shown in FIG. 7. FIG. 10 is a graphical representation indicating the relationship between frequencies of the electric discharge machining power source shown in FIG. 7 and resonance machining gap. FIG. 11 is a voltage—current Lissajous' waveform at the time of gap resonance in the electric discharge machining power source shown in FIG. 7.

The operation of the electric discharge machining power source shown in FIG. 7 will be described. In an electric discharge machining operation with a high frequency higher than 7 MHz, displacement current flows through the interelectrode capacitor 15 formed (at the gap 26) by the electrode and the workpiece, and therefore the current flowing in the gap 26 is the sum of the discharge current and the displacement current. According to actual measurements, when no electric discharge occurs, the displacement current leads the voltage; and at the occurrence of electric discharge, the current is substantially in phase with the voltage, and the circuit can be placed in resonance state. The displacement current, being the variation with time of the electric field in the machining gap (electron not moving in the gap 26), will not contribute directly to the machining operation. The displacement current value and the phase difference depend on the capacitance of the gap 26 and the voltage frequency.

The above-described electric discharge machining operation with gap resonance is completely different in characteristic from the high frequency electric discharge machining operation disclosed the aforementioned Japanese Patent Application (OPI) No. 260915/1986.

In FIG. 7, the gap capacitor 25 ($C_g$) is increased as the interelectrode distance is decreased, and the gap capacitor 25 ($C_g$) and the distributed inductance 24 ($L_m$) (or the inductive circuit 27) form a resonance circuit. The resonance circuit is a series resonance circuit, and its resonance frequency is as follows:

$$f_o = 1/\pi \sqrt{LC_g} \ (Hz)$$

In the case of a wire cut electric discharge machining operation, the capacitance $L_g$ gap capacitor 25 formed (at the gap 26) between the wire electrode and the workpiece depends greatly on the machining gap distance e as shown in FIG. 8. According to the electric image method, the capacitance $C_g$ of the gap capacitor 25 is as follows:

$$C_g = \frac{2\pi\epsilon_o}{\log((2e + r)/r)} \cdot t [F] \quad (a)$$

where r is the electrode radius (mm), e is the machining gap distance (mm), $\epsilon_o$ is the machining solution's dielectric constant, and t is the electrode length (mm).

When the above-described equation (a) is solved with respect to e, then $$e = (r/2)[exp((2\pi\epsilon_o \cdot t)/C_g) - 1] (mm) \quad (b)$$

The capacitance $C_g$ of the gap capacitor 25 with which resonance occurs at a given frequency f, and the machining gap distance e at that time instant are calculated according to the above-described equations (a) and (b). The results of calculations are as indicated in FIGS. 9 and 10.

As is apparent from those figures, with a range of low frequencies, the gap capacitance $C_g$ for resonance is large, and resonance takes place only with a small machining gap; while with a range of high frequencies, the gap capacitance $C_g$ (25) is small, and resonance occurs with a relatively large machining gap. For instance, in the case of a frequency (f) of 2 MHz, the capacitance $C_g$ is 0.03 μF, and the resonance machining gap e is very short, 0.07 μm, and therefore no resonance take place with an ordinary machining gap. If, on the other hand, f is 20 MHz, then $C_g$ is 320 pF, and the resonance machining gap e is relatively large, 8 μm, and therefore an electric discharge machining operation can be carried out with gap resonance.

Because of the above description and through experimental electric discharge machining operations, it is confirmed that with high frequencies higher than 7 MHz, it is possible to cause gap resonance with a relatively wide range of machining gaps (several micrometers (μm), as a result of which the discharge characteristic is greatly different from that of the ordinary high frequency electric discharge machining operation.

FIG. 11 shows a Lissajous' waveform (volt-ampere characteristic) provided when no electric discharge takes place, or at time of short-circuiting, or at the occurrence of electric discharge (or at the time of gap resonance). As is apparent from FIG. 11, when no electric discharge takes place, the current leads the voltage by a phase angle of 90° (being pure displacement current); whereas at the occurrence of electric discharge, the current is in phase with the voltage, and electric discharge occurs with resonance. With a range of high frequencies higher than 7 MHz, electric discharge takes place only when gap resonance occurs.

In the electric discharge machining operation with gap resonance, the voltage appearing across the gap capacitor 25 is increased high enough to cause dielectric breakdown, however, after an occurrence of electric discharge, the inductance L will prevent a current from flowing in the gap 26 abruptly, so that the electric discharge machining operation is carried out with extremely small current capacity. Since the circuit 27 between the gap capacitor 25 and the AC power source 21 becomes inductive, the energy of the stray capacitance 23 existing in the current supplying line etc. will not serve as discharge energy.

The electric discharge machining operation carried out with gap resonance in a high frequency range higher than 7 MHz provides a machined surface extremely excellent in surface roughness, 0.2 μm Rmax. The machined surface is a lustrous semi-mirror-finish surface, whereas the surface discharge-machined with a frequency of 2 MHz is a satin finish surface.

In the above-described embodiment, the machining operation can be performed more stably by changing the frequency of the AC source 11 according to the condition of the gap 26 and a given machining thickness to thereby adjust the machining gap e for resonance.

Furthermore in the above-described embodiment, variation of the reactance of the circuit 27 allows a stable electric discharge machining operation against variation of the gap capacitance 25.

Figure 12:
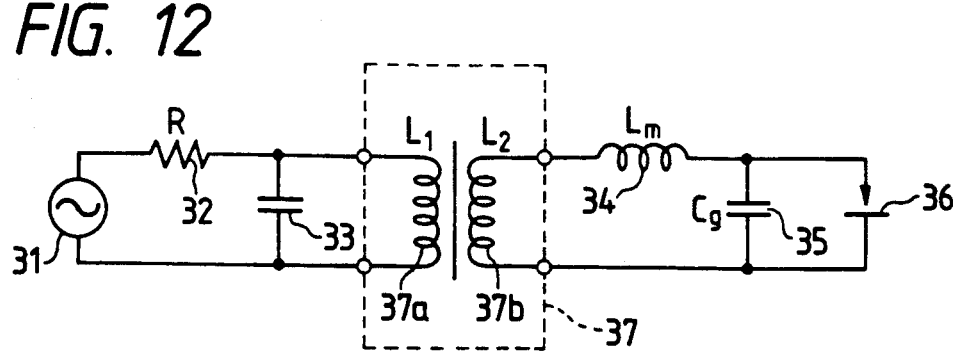
FIG. 12 is a circuit diagram showing an electric discharge machining power source, which is a third embodiment of the invention.

FIG. 12 is a circuit diagram showing an electric discharge machining power source, a third embodiment of the invention. In the figure, reference numeral 31 designates an AC power source; 32, a current controlling resistor; 33, a stray capacitance existing in a current supplying line (feeder line) and the circuit; 34, a stray inductance (distributed inductance $L_m$) existing in the current supplying line and a mechanical structure (such as a current supplying section); 35, an interelectrode capacitor (gap capacitance $C_g$) formed by an electrode and a workpiece to be machined; 36, a gap formed between the electrode and the workpiece; and 37, a coupling transformer, or an inductive coupling circuit, provided near the gap 36.

Figure 13:
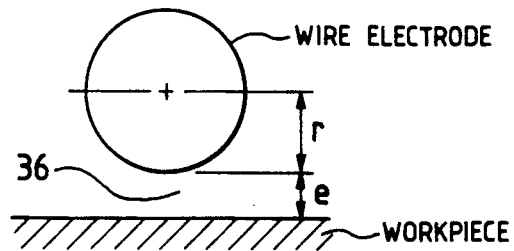
FIG. 13 is an explanatory diagram showing an interelectrode gap formed between an electrode and a workpiece to be machined in the power source shown in FIG. 12.
Figure 14:
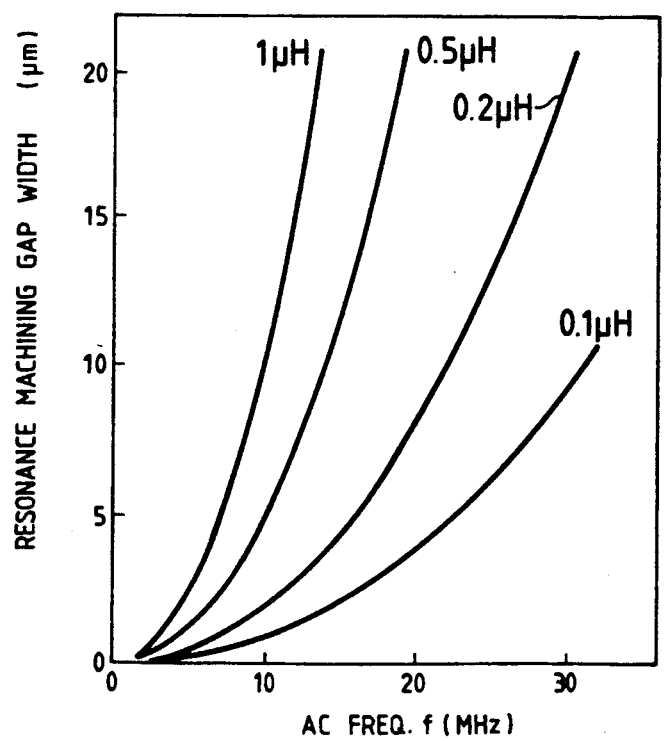
FIG. 14 is a graphical representation indicating with several power source frequencies, the relationships between inductances of the secondary winding of a coupling transformer and resonance machining gaps in the power source shown in FIG. 12.

FIG. 13 is an explanatory diagram showing the gap formed between the electrode and the workpiece in the electric discharge machining power source shown in FIG. 12. FIG. 14 is a graphical representation indicating the relationships, with several power source frequencies, between coupling transformer's secondary inductances and resonance machining gaps.

The operation of the electric discharge machining power source shown in FIG. 12 will be described. In the coupling transformer, a primary coil 37a (inductance $L_1$) is coupled to a secondary coil 37b (inductance $L_2$) for energy transmission (with mutual inductance M). The distributed inductance $L_m$ (34) of the mechanical structure and the gap capacitance $C_g$ (35) of the machining gap depend greatly on the machining gap e as shown in FIG. 13. When the secondary coil 37b of the coupling transformer 37 is connected to the gap 36 with the shortest wire, then the distributed capacitance of the feeder line on the secondary side can be substantially disregarded, being several tens of pico-Farad (pF). On the secondary side of the coupling transformer, a resonance circuit is formed by $L_z$, $L_m$ and $C_g$. The resonance frequency $f_o$ of the resonance circuit is as follows:

$$f_o = \frac{1}{2\pi \sqrt{(L_z + L_m) \cdot C_g}} \; (Hz)$$

Therefore, when the self inductance $L_z$ of the secondary coil 37b is increased, the resonance frequency is decreased with the gap capacitance $C_g$ maintained unchanged. If, in this case, the resonance frequency $f_o$ is maintained unchanged, then gap capacitance $C_g$ for resonance is decreased. Therefore, it is possible to cause resonance with a wider machining gap.

If the distributed inductance $L_m$ (34) of the mechanical structure is much smaller than the $L_2$ of the secondary coil 37b, then the voltage $V_{L2}$ across the coil 37b is opposite in phase to the voltage $V_g$ across the gap capacitor 35 at all times, and the two voltages are equal in amplitude to each other at the time of resonance. That is, when the voltage across the coil 37b is sufficiently high, then a voltage substantially equal to the voltage is developed across the gap capacitor 35 at the time of resonance.

FIG. 14 indicates the relationships, with several power source frequencies, between an inductance $L_z$ and resonance machining gap. As is apparent from FIG. 14, the machining gap for resonance is increased as the inductance $L_z$ increases. This means that not only gap resonance can be caused with ease, but also the resonance can be maintained stable against variation of the machining gap (the gap capacitance $C_g$ (35) being less changed with respect to displacement of a wire electrode shown in FIG. 13). Accordingly, the machining stability and the machining capability (discharge frequency) is greatly improved. Furthermore, the effect (distributed capacitance) of the primary feeder line is eliminated. This will be advantageous in practical use. However, if the inductance $L_z$ is increased excessively, then the machining gap for resonance is also increased excessively, as a result of which no dielectric breakdown is caused, and accordingly it becomes difficult to perform the machining with gap resonance. Hence, it is necessary to select the inductance of the secondary coil 37b according to the power source frequency. For instance in the case of an AC frequency 10 MHz, by setting the inductance $L_z$ to 0.5 to 1.0 $\mu$H the resonance machining gap can be set to 5 to 10 $\mu$m (in the case where the thickness t is 20 mm), whereby the machining operation can be performed stably.

In high frequency machining, displacement current flows through the interelectrode capacitor 35 formed by the electrode and the workpiece (at the gap 36), and therefore the current in the gap 36 is the sum of the discharge current and the aforementioned displacement current. According to actual measurements, when no electric discharge occurs, the displacement current leads the voltage; and at the occurrence of electric discharge, the current is substantially in phase with the voltage, and the circuit can be placed in resonance state. The displacement current, being the variation with time of the electric field in the machining gap (electrons not moving in the machining gap), will not contribute directly to the machining operation. The displacement current value and the phase difference depend on the capacitance of the gap 36 and the voltage frequency.

The above-described electric discharge machining operation with gap resonance is completely different in characteristic from the high frequency electric discharge machining operation disclosed the aforementioned Japanese Patent Application (OPI) No. 260915/1986. In the electric discharge machining operation with gap resonance, the voltage of the gap capacitor 35 is increased high enough to cause dielectric breakdown; however, after occurrence of electric discharge, the inductance $L_z$ will prevent a current flowing in the gap 36 abruptly, so that the electric discharge machining operation is carried out with extremely small current capacity.

In the above-described embodiment, the coupling transformer 37 is provided near the gap 36, and therefore the machining operation can be carried out with the gap resonance caused at a frequency lower than 10 MHz. In this case, the resultant machined surface is excellent in surface roughness, being 0.2 $\mu$m Rmax. The machined surface is a lustrous semi-mirror-finish surface; whereas the surface formed by the ordinary high frequency electric discharge machining method is a satin finish surface.

In the above-described embodiment, the machining operation can be performed more stably by changing the frequency of the AC source 31 according to a given machining area or thickness.

Furthermore in the above-described embodiment, variation of the inductance of the secondary coil 37b of the coupling transformer 37 allows a stable electric discharge machining operation against variation of the gap capacitance 35.

Figure 15:
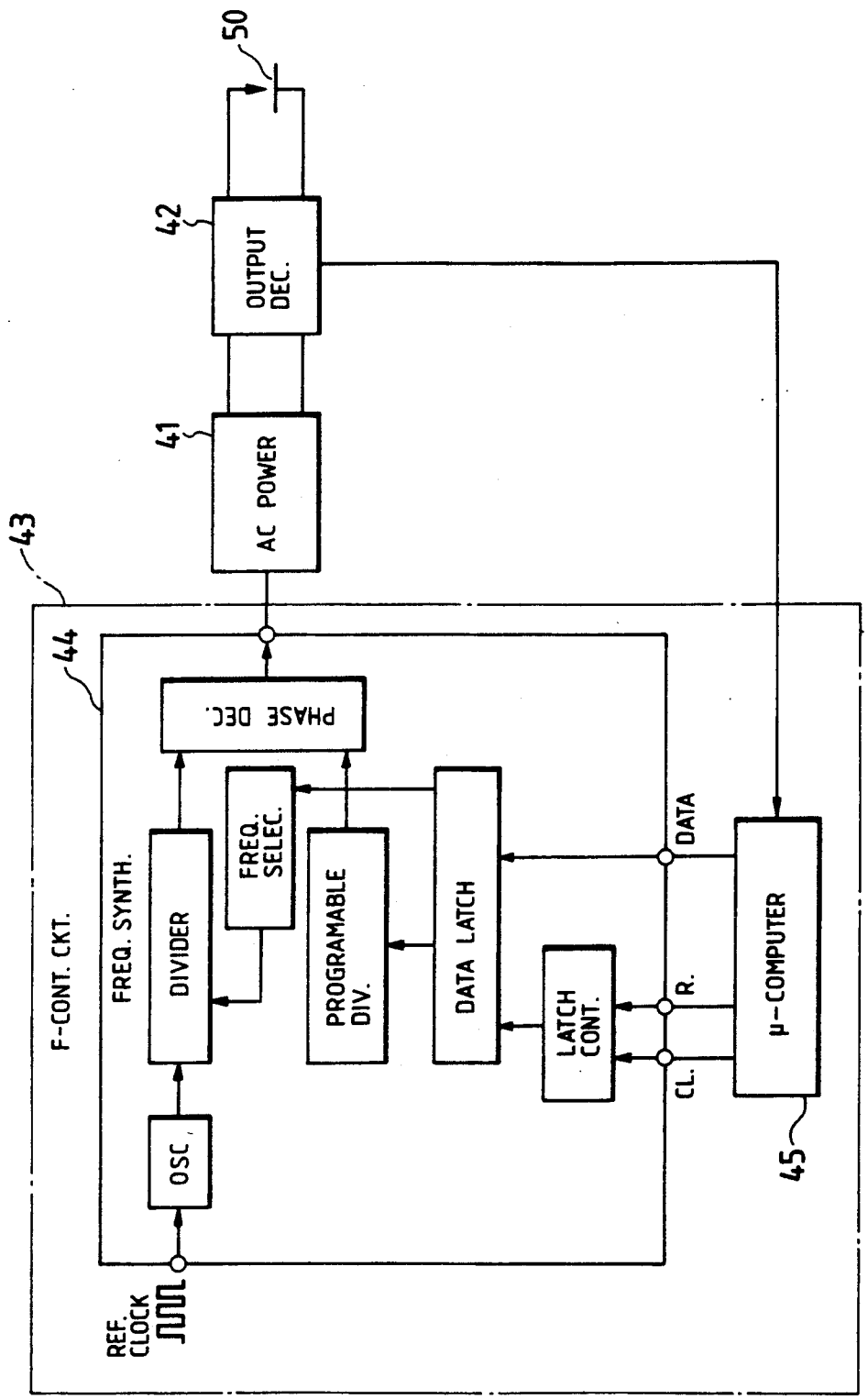
FIG. 15 is a circuit diagram showing an electric discharge machining power source, which is a fourth embodiment of the invention.

FIG. 15 is a circuit diagram of an electric discharge machining power source, a fourth embodiment of the invention. In the figure, reference numeral 41 designates an AC source; 42, an output detecting unit; 43, a frequency control circuit; and 45, a microcomputer.

Figure 16:
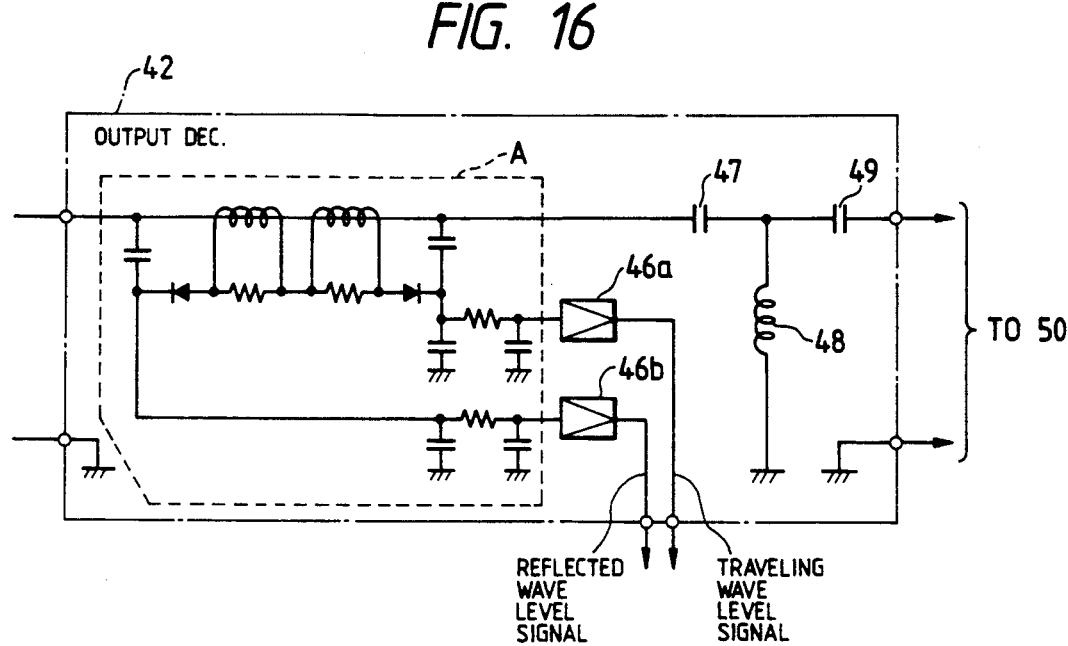
FIG. 16 is a circuit diagram showing the internal arrangement of an output detecting unit in the power source shown in FIG. 15.

FIG. 16 is a circuit diagram of the output detecting unit 42 in the electric discharge machining power source shown in FIG. 15. In FIG. 16, reference numeral 46a and 46b designate A/D (analog-to-digital) converters, respectively; 47, a coupling capacitor; 48, a coil; 49, a coupling capacitor; and 50, an interelectrode gap between an electrode and a workpiece to be machined.

Figure 1:
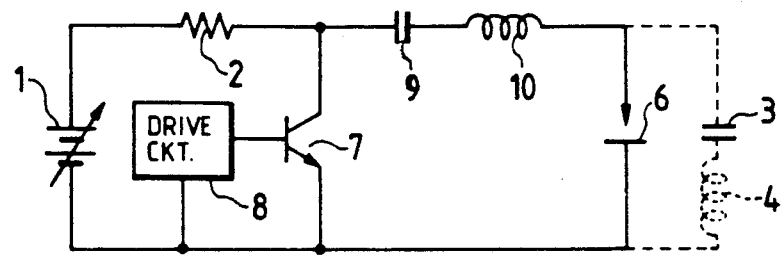
FIG. 1 a circuit diagram showing a conventional electric discharge machining power source.
Figure 2:
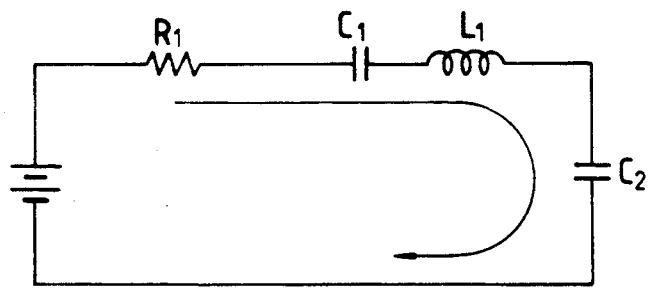
FIGS. 2 and 3 are circuit diagram showing equivalent circuits for a description of the operation of the conventional electric discharge machining power source shown in FIG. 1.
Figure 3:
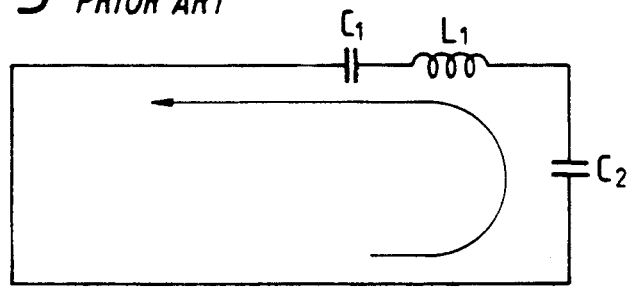

The operation of the electric discharge machining power source shown in FIG. 15, the fourth embodiment of the invention, will be described. When, similarly as in the case of the conventional electric discharge machining power source shown in FIG. 1, the switching element 7 is turned on and off by the drive circuit 8, the AC source 41 outputs a high frequency voltage. The output voltage is applied, as an interelectrode voltage or gap voltage, to the interelectrode gap 50 through the current supplying line and the output detecting unit 42.

In general, in transmission of a high frequency wave, there are a traveling wave and a reflected wave (which is a wave reflected at the output end in the opposite direction), and when impedance machining is satisfied in a good condition, only the traveling wave remains, so that the output is made maximum. In other words, in order to obtain the maximum output, it is necessary to minimize the ratio of traveling wave to reflected wave. In FIG. 16, reference character A designates a circuit for obtaining the level signals of a traveling signal and a reflected signal as voltage signals. The level signal of a traveling signal is applied through the A/D converter 46a to the microcomputer 45. Similarly, the level signal of a reflected signal is applied through the A/D converter 46b to the microcomputer 45.

A high frequency signal applied to the output detecting unit 42 is impedance-matched by a T-shaped matching circuit consisting of the coupling capacitors 47 and 49 and coil 48, and the output of the T-shaped matching circuit is applied to the interelectrode gap 50. In this operation, the microcomputer 45 operates to vary the output frequency of a frequency synthesizer 44; i.e., the output frequency of the AC power source 41 so that the ratio of reflected wave to traveling wave be minimized according to the level signals of the preceding traveling wave and reflected wave. A control process by the microcomputer 45 is for instance as follows: First, the frequency is increased little by little as trial, and when the output is increased by the little increment of the frequency, then the frequency is further increased, whereas when the output is decreased, then the frequency is decreased. Finally when the output of the AC power source 41 becomes maximum, the frequency is locked. When, during machining, the machining area or conditions are changed whereby the output is changed more than a predetermined value, the locking of the frequency is eliminated, and tuning of the frequency is carried out again. These control operations are carried out when necessary during machining or at all times so as to obtain the best impedance matching.

Figure 17:
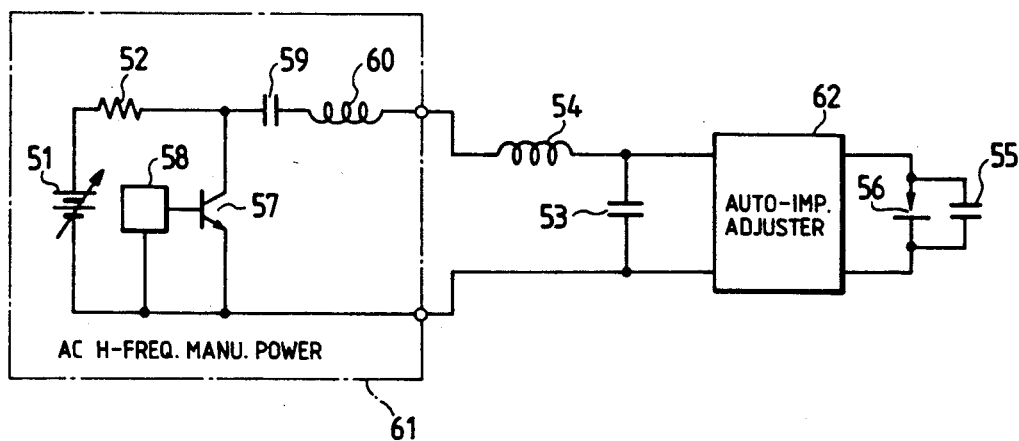
FIG. 17 is a circuit diagram showing an electric discharge machining power source, which is a fifth embodiment of the invention.

FIG. 17 is a circuit diagram showing an electric discharge machining power source, a fifth embodiment of the invention. In the figure, reference numeral 51 designates a DC power source; 52, a current limiting resistor; 53, a stray capacitance existing in the current supplying line (feeder line) and a mechanical structure (such as a current supplying section); 54, a stray inductance 55, an interelectrode capacitor formed by an electrode and a workpiece to be machined; 56, an interelectrode gap between the workpiece and the electrode; 57, a switching element, 58, a drive circuit for driving the switching element: 59, a coupling capacitor connected between the switching element 57 and the interelectrode gap 56; 60, a coupling coil connected between the switching element 57 and the interelectrode gap 56; 61, an AC source, namely, a high frequency machining power source; and 62, an automatic impedance matching unit.

Figure 18:
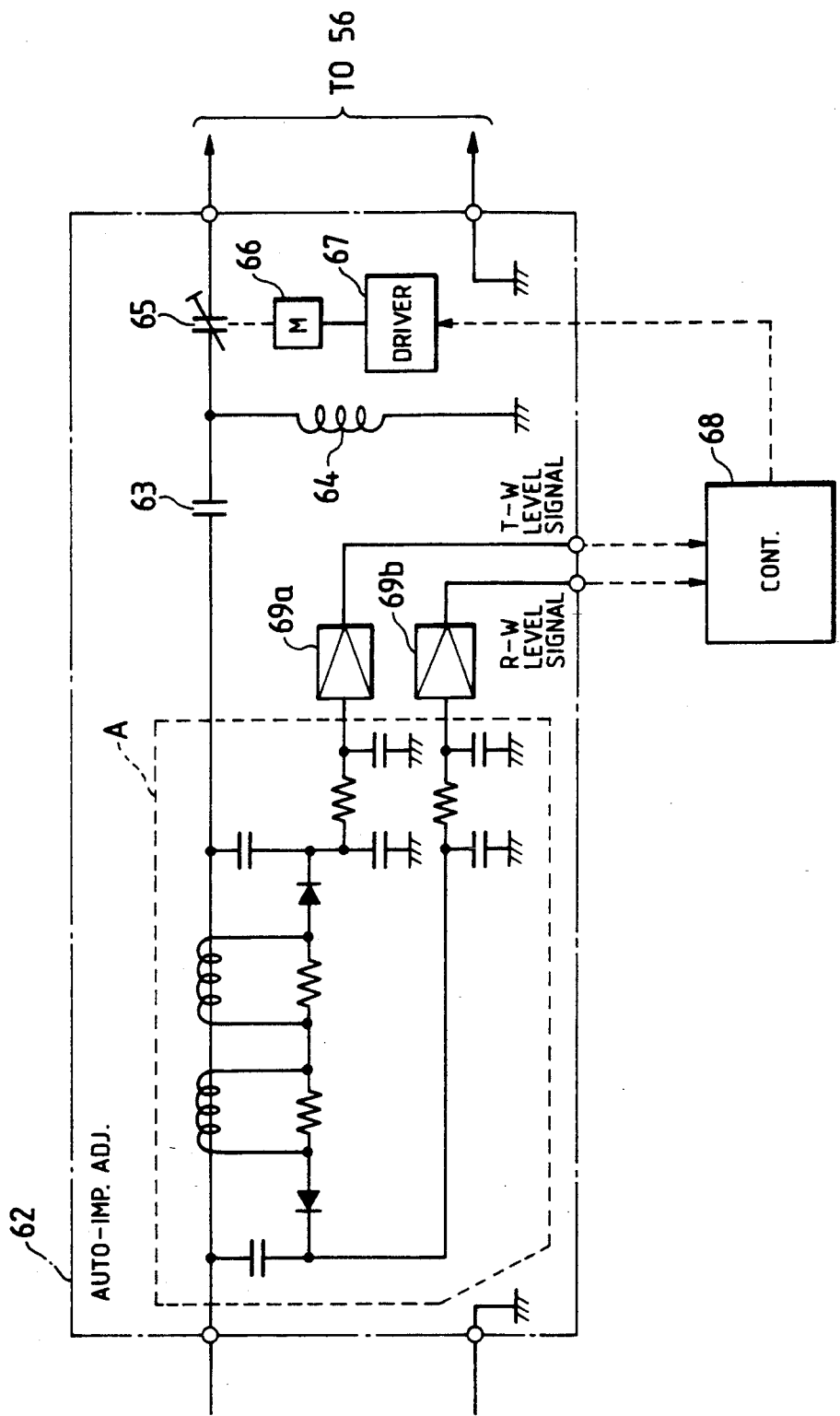
FIG. 18 is a circuit diagram showing the internal arrangement of an automatic impedance matching unit in the power source shown in FIG. 17.

FIG. 18 is a circuit diagram showing the internal arrangement of the automatic impedance matching unit 62 in the electric discharge machining power source shown in FIG. 17. In the figure, reference numeral 63 designates a coupling capacitor; 64, a coil; 65, a variable capacitor; 66, an actuator (or motor) for changing the capacitance of the variable capacitor 65; 67, a drive circuit for driving the actuator 66; 68, a control unit; and 69a and 69b, A/D (analog-to-digital) converters.

The operation of the electric discharge machining power source shown in FIG. 17, the fifth embodiment of the invention, will be described. When, similarly as in the conventional electric discharge machining power source shown in FIG. 1, the switching element 57 is turned on and off by the drive circuit 58, the high frequency machining power source 61 outputs a high frequency voltage. The output voltage is supplied, as a gap voltage, to the interelectrode gap 56 through the current supplying line and the automatic impedance matching unit 62. Thus, the electric discharge machining operation is started.

In general, as described above, there are a traveling wave and a reflected wave (which is a wave reflected at the output end in the opposite direction) in transmission of a high frequency wave, and when impedance matching is good, only the traveling wave remains, so that the output is maximized. That is, in order to maximize the output, it is necessary to minimize the ratio of reflected wave to traveling wave. In FIG. 18, reference character A designates a circuit for converting the level signals of a traveling wave and a reflected wave into voltage signals. The voltage signal of a traveling signal is applied through the A/D converter 69a to the control unit 68. Similarly, the voltage signal of a reflected wave is applied through the A/D converter 69b to the control unit 68.

A high frequency signal applied to the automatic impedance matching unit 62 is subjected to impedance matching by a T-shaped matching circuit consisting of the coupling capacitor 63, the coil 64 and the variable capacitor 65. The output of the T- shaped matching circuit is applied to the interelectrode gap 56. In this operation, the control unit 68 operates to cause the actuator 66 to change the capacitance of the variable capacitor 65 so that the ratio of reflected wave to traveling wave be minimized according to the level signals of the preceding traveling wave and reflected wave. These control operations are carried out when necessary during machining or at all times so the best impedance matching is obtained.

As was described above, in the first example of the electric discharge machining power source according to the invention, the L-shaped circuit comprising the capacitor parallel-connected to the interelectrode gap formed between the electrode and the workpiece and the coil series-connected to the interelectrode gap is provided in the vicinity of the interelectrode gap, and resonance is caused to occur with the capacitance of the interelectrode gap and the inductance of the L-shaped circuit, to machine the workpiece. Hence, with the power source, electric discharge is provided with extremely small current capacity, and the resultant machined surface is excellent; that is, semi-mirror-finish surfaces higher than 0.2 μm Rmax in surface roughness can be obtained.

In the second example of the electric discharge machining power source according to the invention, resonance is caused to occur with the capacitance of the interelectrode gap formed between the electrode and the workpiece and the inductance of the circuit before the interelectrode gap, to machine the workpiece. Hence, with the power source, electric discharge is caused with extremely small current capacity, and the resultant machined surface is excellent; that is, semi-mirror-finish surfaces higher than 0.2 μm Rmax in surface roughness can be obtained.

In the third example of the electric discharge machining power source according to the invention, the coupling transformer is provided near the interelectrode gap formed between the electrode and the workpiece, and resonance is caused to occur with the capacitance of the interelectrode gap and the inductance of the secondary coil of the coupling transformer, to machine the workpiece. Hence, with the power source, electric discharge is caused with extremely small current capacity, and the resultant machined surface is excellent; that is, semi-mirror-finish surfaces higher than 0.2 μm Rmax in surface roughness can be obtained.

In the fourth example of the electric discharge machining power source according to the invention, even when the impedance of the interelectrode gap formed between the electrode and the workpiece is changed with variation of the machining gap or area, the frequency of the source is changed by the frequency control circuit, so that the electrode discharge machining operation is carried out while impedance matching being effected. Hence, the electrode discharge machining operation can be achieved with high efficiency, and semi-mirror-finish surfaces can be formed with high stability.

In the fifth example of the electric discharge machining power source according to the invention, even when the impedance of the interelectrode gap formed between the electrode and the workpiece is changed with variation of the machining gap or area, the electric discharge machining operation is carried out while impedance matching is being effected by the automatic impedance matching unit. Hence, the electrode discharge machining operation can be achieved with high efficiency, and semi-mirror-finish surfaces can be formed with high stability.

What is claimed is:

1. A power source for an electric discharge machining in which voltage is applied across an electrode and a workpiece to be machined to cause electric discharge in an interelectrode gap formed between said electrode and said workpiece to thereby machine said workpiece, comprising:
   an AC source for applying an AC voltage to an interelectrode gap having a capacitance; and
   a resonance circuit, for causing resonance to occur with the capacitance, whereby an electric discharge machining is carried out under an occurrence of resonance.

2. The power source as defined in claim 1 wherein said resonance circuit comprises capacitance means connected in parallel with said interelectrode gap and inductance means connected in series with said interelectrode gap, said resonance circuit being operatively connected to said interelectrode gap.

3. The power source as defined in claim 2 wherein said capacitance means is a capacitor and said inductance means is a coil.

4. The power source as defined in claim 1 wherein said resonance circuit comprises an inductance element existing in a circuit between said interelectrode gap and said AC source, said inductance element causing resonance to occur with the capacitance of said interelectrode gap.

5. The power source as defined in claim 1 wherein said resonance circuit comprises a coupling transformer provided near said interelectrode gap, resonance being caused to occur with the capacitance between an electrode and a workpiece, and the inductance of a secondary coil of said coupling transformer.

6. A power source for electric discharge machining in which voltage is applied across an electrode and a workpiece to be machined to cause electric discharge in an interelectrode gap formed between said electrode and said workpiece to thereby machine said workpiece comprising:
   an AC source for applying AC voltage to an interelectrode gap;
   an output detecting unit for detecting an output of said Ac source and for performing impedance matching with said interelectrode gap; and
   a frequency control circuit for automatically changing the frequency of said AC source according to a detection value provided by said output detecting unit,
   wherein a high frequency signal applied to said output detecting unit by said AC source is subjected to impedance-matching in response to variation in impedance of said interelectrode gap prior to being applied to said interelectrode gap.

7. The power source as defined in claim 6 wherein the impedance-matching is effected by a T-type matching circuit including first and second coupling capacitors and a coil connected between a middle connection point of a series circuit of said capacitors and a ground.

8. A power source for electric discharge machining in which voltage is applied across an electrode and a workpiece to be machined to cause electric discharge in an interelectrode gap formed between said electrode and said workpiece thereby to machine said workpiece, comprising:
   an AC source for applying AC voltage to an interelectrode gap; and
   an automatic impedance-matching unit provided between said AC source and said interelectrode gap, wherein an electric discharge machining operation is carried out while impedance matching is automatically effected in response to variations in an impedance of said interelectrode gap.

9. The power source as defined in claim 8 wherein said automatic impedance-matching unit comprises:
   a T-type matching circuit including first and second coupling capacitors and a coil connected between a middle point of a series circuit of said first and second capacitors and a ground; and
   an actuating means for varying the capacitance of said second capacitor so as to minimize a ratio of a reflected wave to a travelling wave according to the signal levels of the preceding reflected and travelling waves.

10. An apparatus for use in electric discharge machining by providing a voltage across an interelectrode gap formed between an electrode and a workpiece to be machined, the interelectrode gap having a capacitance, said apparatus having a stray capacitance, said apparatus comprising:

power source means for producing an AC voltage; and resonance setting means for substantially eliminating a stray capacitance and for placing said apparatus in resonance with the capacitance of an interelectrode gap.

11. An apparatus as defined in claim 10, wherein the AC voltage has a frequency, and wherein said resonance setting means comprises a frequency control circuit for changing the frequency of the AC voltage in response to a change in impedance of said interelectrode gap to maintain said apparatus in resonance.

12. An apparatus for use in electric discharge machining by providing a voltage across an interelectrode gap formed between an electrode and a workpiece to be machined, the interelectrode gap having a capacitance, said apparatus comprising: power source means for producing an Ac voltage having a frequency;

output detection means for detecting a travelling wave signal level and a reflected wave signal level;

impedance matching means for use in matching impedance of said apparatus with a capacitance of an interelectrode gap; and frequency control means for changing the frequency of the AC voltage in response to a change in impedance of said interelectrode gap to maintain said apparatus in resonance based on the travelling wave signal level and the reflected wave signal level detected by said output detection means.

13. An apparatus as defined in claim 12, wherein said apparatus has a stray capacitance associated therewith, and wherein said impedance matching means substantially eliminates the stray capacitance.

14. An apparatus for use in electric discharge machining by providing a voltage across an interelectrode gap formed between an electrode and a workpiece to be machined, the interelectrode gap having a capacitance, said apparatus comprising:

power source means for producing an AC voltage; and impedance matching means for automatically maintaining a matched impedance of said apparatus with a capacitance of an interelectrode gap.

15. An apparatus as defined in claim 14, wherein said impedance matching means comprises:

output detection means for detecting a travelling wave signal level and a reflected wave signal level; and control means for maintaining the matched impedance in response to a change in impedance of said interelectrode gap based on the travelling wave signal level and the reflected wave signal level detected by said output detection means.

16. An apparatus as defined in claim 15, wherein said impedance matching means further comprises a variable capacitor, and wherein said control means comprises means for adjusting said variable capacitor.

17. An apparatus as defined in claim 14, wherein said apparatus has a stray capacitance associated therewith, and wherein said impedance matching means substantially eliminates the stray capacitance.

* * * * *